United States Patent
Gao et al.

(10) Patent No.: US 11,044,140 B2
(45) Date of Patent: Jun. 22, 2021

(54) METHOD AND APPARATUS FOR SERIALIZATION AND DESERIALIZATION OF MESSAGE STRUCTURE

(71) Applicant: MICROFUN CO., LTD, Beijing (CN)

(72) Inventors: Chi Gao, Beijing (CN); Guangrong Su, Beijing (CN); Yingjie Han, Beijing (CN)

(73) Assignee: MICROFUN CO., LTD, Beijing (CN)

( * ) Notice: Subject to any disclaimer, the term of this patent is extended or adjusted under 35 U.S.C. 154(b) by 0 days.

(21) Appl. No.: 16/695,478

(22) Filed: Nov. 26, 2019

(65) Prior Publication Data

US 2021/0028970 A1 Jan. 28, 2021

(30) Foreign Application Priority Data

Jul. 26, 2019 (CN) .......................... 201910682876.1

(51) Int. Cl.
| | |
|---|---|
| *G06F 15/16* | (2006.01) |
| *H04L 12/24* | (2006.01) |
| *G06F 16/958* | (2019.01) |
| *H04L 29/08* | (2006.01) |
| *H04L 29/06* | (2006.01) |

(52) U.S. Cl.
CPC ........ *H04L 41/0266* (2013.01); *G06F 16/986* (2019.01); *H04L 67/02* (2013.01); *H04L 67/42* (2013.01)

(58) Field of Classification Search
CPC ..... H04L 41/0266; H04L 67/02; H04L 67/42; G06F 16/986
See application file for complete search history.

(56) References Cited

U.S. PATENT DOCUMENTS

| | | | |
|---|---|---|---|
| 8,583,871 B2* | 11/2013 | Ebdon ................ | G06F 12/0891 711/125 |
| 2003/0005169 A1* | 1/2003 | Perks ................... | G06F 9/4493 719/315 |
| 2003/0167349 A1* | 9/2003 | Krohn ................. | G06F 9/44536 719/311 |
| 2003/0233477 A1* | 12/2003 | Ballinger ............... | G06F 9/547 709/246 |

* cited by examiner

*Primary Examiner* — Yves Dalencourt
(74) *Attorney, Agent, or Firm* — Maier & Maier, PLLC

(57) ABSTRACT

Embodiments of the present disclosure provide a method and an apparatus for serialization and deserialization of a message structure. The method for serialization includes: acquiring a message structure, and pre-processing the message structure to generate a corresponding target version number, wherein message structures with different contents correspond to different version numbers, and the message structure is a structure of status information transmitted by a server to a client; serializing information to be transmitted to obtain a corresponding byte stream, wherein the information to be transmitted carries data of the status information and the target version number; and transmitting the byte stream to the client. The method and apparatus for serialization and deserialization of a message structure according to the embodiments of the present disclosure have good version control, which can avoid the problem that the program runs incorrectly caused by inconsistency of the versions of the serialization and deserialization.

9 Claims, 5 Drawing Sheets

METHOD AND APPARATUS FOR SERIALIZATION AND DESERIALIZATION OF MESSAGE STRUCTURE

CROSS-REFERENCE TO RELATED APPLICATION

This application claims priority to Chinese Patent Application No. 201910682876.1, filed on Jul. 26, 2019, which is hereby incorporated by reference in its entirety.

TECHNICAL FIELD

Embodiments of the present disclosure relate to the field of computer technologies, in particular, to a method and apparatus for serialization and deserialization of a message structure.

BACKGROUND

Serialization is a process of converting status information of an object into a form that can be stored or transmitted, and generally, the form is a byte stream. The opposite is a process of deserialization, which reconstructs the object from the byte stream. Serialization enables objects to be transmitted from one place to another, so that the program is more maintainable, and the object can be stored to make the custom object persistent.

When a client and a server deliver structured data over a network, in order to make the data transmitted on the network independent of a development language and platform, or to reduce a traffic transmitted on the network, a serialization scheme is often used for transmission. The existing methods for serialization and deserialization are generally based on a mixed protocol data standard of Google Protocol Buffer and using a .proto file to define a serialization format, where the .proto file can be compiled into source code of languages such as C++, Java and Python. That is, a message defined in the .proto file is mapped to a corresponding data structure in the programming language.

According to the existing methods for serialization and deserialization, in the processes of serialization and deserialization, generally, the manner where a program developer maintains a version of the program is used, and different object definitions may be assigned a same version number. When the definitions of objects on the client and server side are inconsistent, a problem that the serialization and deserialization versions are inconsistent and cause the program to run incorrectly is likely to occur.

SUMMARY

In order to solve the above problem, embodiments of the present disclosure provide a method and an apparatus for serialization and deserialization of a message structure.

In a first aspect, an embodiment of the present disclosure provides a method for serialization of a message structure, including:

acquiring a message structure, and pre-processing the message structure to generate a corresponding target version number, where message structures with different contents correspond to different version numbers, and the message structure is a structure of status information transmitted by a server to a client;

serializing information to be transmitted to obtain a corresponding byte stream, where the information to be transmitted carries data of the status information and the target version number; and transmitting the byte stream to the client.

In a possible implementation, a format of the message structure is an extensible markup language schema definition format, and the serializing information to be transmitted to obtain a corresponding byte stream includes:

processing the message structure through extensible stylesheet language transformations to obtain codes in multiple programming languages, where a code in each of the programming languages includes a first code and a second code, where the first code is a data structure code corresponding to the message structure, and the second code is a serialization function code and a deserialization function code;

serializing the information to be transmitted according to a serialization function code in a first programming language to obtain the corresponding byte stream, where the first programming language is one of the multiple programming languages.

In a possible implementation, the acquiring a message structure, and pre-processing the message structure to generate a corresponding target version number includes:

acquiring a message structure of an extensible markup language schema definition format;

standardization-processing the message structure of the extensible markup language schema definition format to obtain a processed message structure, where the standardization-processing includes removing an annotation in the message structure of the extensible markup language schema definition format and ranking fields in the message structure of the extensible markup language schema definition format; and obtaining the target version number according to the processed message structure.

In a second aspect, an embodiment of the present disclosure provides a method for deserialization of a message structure, including:

acquiring a byte stream transmitted by a server, where the byte stream includes data of status information and a target version number, and the byte stream is obtained by serializing the data of the status information and the target version number by the server; and deserializing the byte stream according to the target version number, to obtain a corresponding message structure;

In a possible implementation, the deserializing the byte stream according to the target version number, to obtain a corresponding message structure includes:

acquiring codes in multiple programming languages according to the target version number, where a code in each of the programming languages includes a first code and a second code, where the first code is a data structure code corresponding to the message structure, and the second code is a serialization function code and a deserialization function code, the byte stream is obtained by serializing data of the message structure according to the serialization function code in a first programming language, where the first programming language is one of the multiple programming languages;

deserializing the byte stream through a deserialization function code in a second programming language to obtain data in the second programming language, where the second programming language is one of the multiple programming languages;

obtaining a message structure in the second programming language through the first code in the second programming language and the data in the second programming language.

In a possible implementation, the acquiring codes in multiple programming languages according to the target version number includes:

acquiring a message structure of a corresponding extensible markup language schema definition format, according to the target version number;

acquiring the first code and the second code in the multiple programming languages, according to the message structure of the extensible markup language schema definition format.

In a third aspect, an embodiment of the present disclosure provides an apparatus for serialization of a message structure, including:

a processing module, configured to acquire a message structure, and pre-process the message structure to generate a corresponding target version number, where message structures with different contents correspond to different version numbers, and the message structure is a structure of status information transmitted by a server to a client;

a serializing module, configured to serialize information to be transmitted to obtain a corresponding byte stream, where the information to be transmitted carries data of the status information and the target version number; and a transmitting module, configured to transmit the byte stream to the client.

In a possible implementation, a format of the message structure is an extensible markup language schema definition format, and the serializing module is specifically configured to:

process the message structure through extensible stylesheet language transformations to obtain codes in multiple programming languages, where a code in each of the programming languages includes a first code and a second code, where the first code is a data structure code corresponding to the message structure, and the second code is a serialization function code and a deserialization function code;

serialize the information to be transmitted according to a serialization function code in a first programming language to obtain a corresponding byte stream, where the first programming language is one of the multiple programming languages.

In a possible implementation, the processing module is specifically configured to:

acquire a message structure of an extensible markup language schema definition format;

standardization-process the message structure of the extensible markup language schema definition format to obtain a processed message structure, where the standardization-processing includes removing an annotation in the message structure of the extensible markup language schema definition format and ranking fields in the message structure of the extensible markup language schema definition format;

obtain the target version number according to the processed message structure.

In a fourth aspect, an embodiment of the present disclosure provides an apparatus for serialization of a message structure, including:

an acquiring module, configured to acquire a byte stream transmitted by a server, where the byte stream includes data of status information and a target version number, and the byte stream is obtained by serializing the data of the status information and the target version number by the server; and a deserializing module, configured to deserialize the byte stream according to the target version number, to obtain a corresponding message structure;

In a possible implementation, the deserializing module is specifically configured to:

acquire codes in multiple programming languages according to the target version number, where a code in each of the programming languages includes a first code and a second code, where the first code is a data structure code corresponding to the message structure, and the second code is a serialization function code and a deserialization function code, the byte stream is obtained by serializing data of the message structure according to the serialization function code in a first programming language, where the first programming language is one of the multiple programming languages;

deserialize the byte stream through a deserialization function code in a second programming language to obtain data in the second programming language, where the second programming language is one of the multiple programming languages;

obtain a message structure in the second programming language through the first code in the second programming language and the data in the second programming language.

In a possible implementation, the deserializing module is specifically configured to:

acquire a message structure of a corresponding extensible markup language schema definition format, according to the target version number;

acquire the first code and the second code in the multiple programming languages, according to the message structure of the extensible markup language schema definition format.

In a fifth aspect, an embodiment of the present disclosure provides a device for serialization and deserialization of a message structure, including: at least one processor and a memory, where, the memory stores a computer execution instruction;

the at least one processor executes the computer execution instruction, so that the at least one processor performs the method for serialization of a message structure according to any one of the first aspect, or the least one processor performs the method for deserialization of a message structure according to any one of the second aspect.

In a sixth aspect, an embodiment of the present disclosure provides a computer readable storage medium having a computer execution instruction thereon, and when the computer execution instruction is executed by a processor, the method for serialization of a message structure according to any one of the first aspect, or the method for deserialization of a message structure according to any one of the second aspect is implemented.

According to the method and apparatus for serialization and deserialization of a message structure provided by the embodiments of the present disclosure, first the server acquires the message structure, and pre-processes the message structure to generate the corresponding target version number, and then the server serializes the information to be transmitted to obtain the corresponding byte stream, and transmits the byte stream to the client, where the information to be transmitted carries the target version number. After acquiring the byte stream, the client deserializes the byte stream according to the target version number to obtain the corresponding message structure. In the embodiments of the present disclosure, message structures with different contents correspond to different version numbers, that is, the target version number is directly related to and uniquely corresponding to the content of the message structure, and therefore, the method according to this embodiment of the present disclosure has good version control, which avoids the problem that different object definitions may be assigned the same version number, ensuring that the serialization and deserialization correspond to the protocol of the same version number, thereby avoiding the problem that the program runs incorrectly caused by inconsistency of the versions of the serialization and deserialization.

BRIEF DESCRIPTION OF THE DRAWINGS

In order to more clearly illustrate technical solutions in embodiments of the present application or the prior art, accompanying drawings required for describing the embodiments or the prior art will be briefly described below. Obviously, the accompanying drawings in the following description are some of the embodiments of the present application, and other drawings can be obtained by those skilled in the art based on these accompanying drawings without any creative effort.

DESCRIPTION OF EMBODIMENTS

In order to make the objects, technical solutions and advantages of the embodiments of the present disclosure clearer, technical solutions in embodiments of the present disclosure will be clearly and completely described below in conjunction with the accompanying drawings in the embodiments of the present disclosure. Apparently, the described embodiments are a part of, instead of all of the embodiments of the present disclosure. All other embodiments obtained by those skilled in the art based on the embodiments of the present disclosure without creative effort will fall within the scope of protection of the present disclosure.

Figure 1:
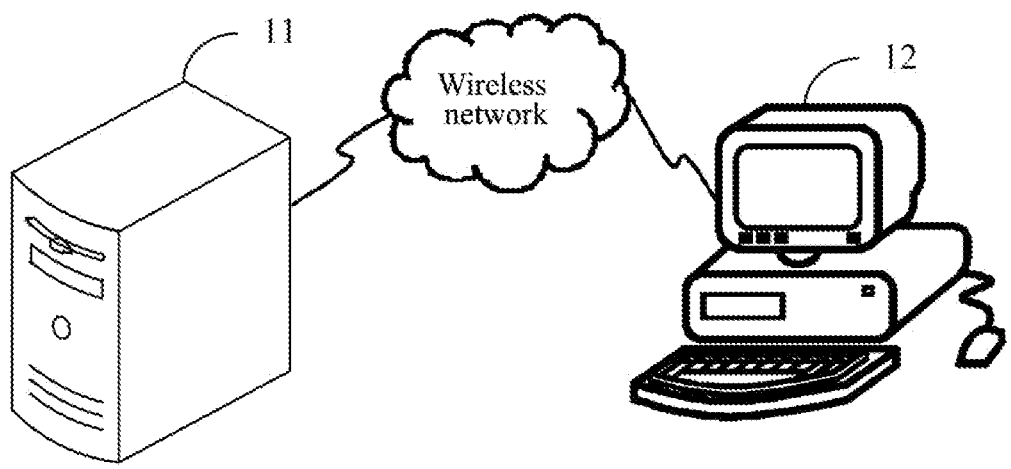
FIG. 1 is a schematic diagram of an application scenario of serialization and deserialization of a message structure according to an embodiment of the present disclosure.

FIG. 1 is a schematic diagram of an application scenario of serialization and deserialization of a message structure according to an embodiment of the present disclosure, as shown in FIG. 1, including a server 11 and a client 12, where the server 11 and the client 12 are connected via a wireless network, and when structured data is transmitted between the server 11 and the client 12 through the wireless network, in order to make the data transmitted on the network independent of a development language and platform, or to reduce a traffic transmitted on the network, a serialization manner is often used for transmission. When the structured data needs to be used, the data can be recovered by deserialization.

Serialization refers to a process of converting structured data to a specified format according to a certain coding specification. Deserialization refers to a process of parsing data converted to the specified format to obtain original structured data. For example, Person is an object type that represents a person, and person is an object of the type Person. The process of converting the structured object person stored in a memory to an unstructured byte stream is a sort of serialization, and correspondingly, the process of inversely converting the unstructured byte stream into the structured object person in the memory is the corresponding deserialization. The serialization process requires certain serialization protocols, such as XML, JavaScript Object Notation (JSON), and so on.

Figure 2:
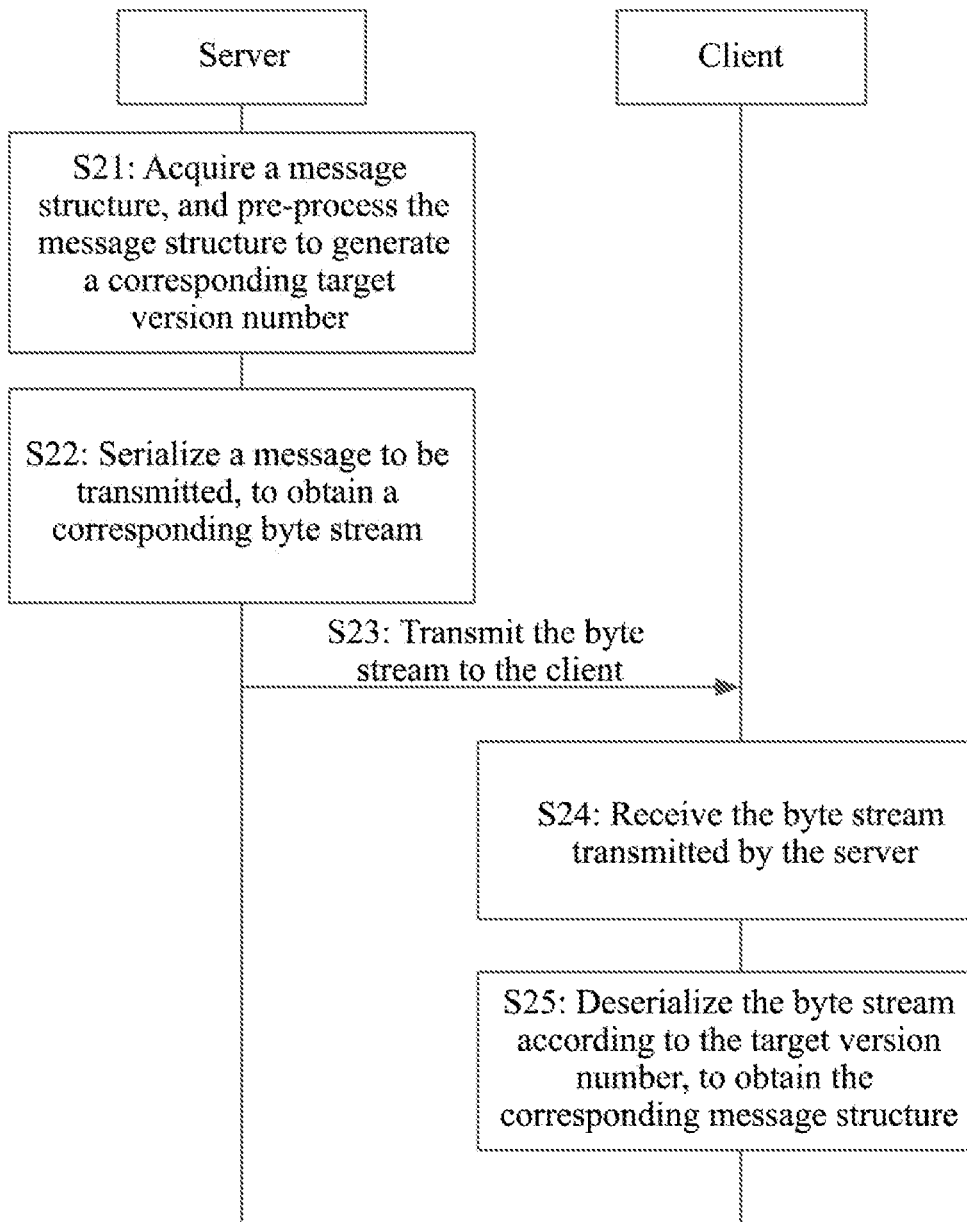
FIG. 2 is a schematic interaction diagram of a method for serialization and deserialization of a message structure according to an embodiment of the present disclosure.

FIG. 2 is a schematic interaction diagram of a method for serialization and deserialization of a message structure according to an embodiment of the present disclosure, as shown in FIG. 2, including:

S21: a server acquires a message structure, and preprocesses the message structure to generate a corresponding target version number.

In the existing serialization solutions, since there is no good application version control, different definitions of the protocol contents may be assigned a same version number, and as a result, an error in a test phase is not easy to find. In the solution provided in this embodiment of the present disclosure, for status information to be transmitted, first its corresponding message structure is acquired, and then a corresponding target version number is obtained by preprocessing the message structure, where the message structure may specifically be an object in a memory, and version numbers corresponding to different message structures are different, that is, the version number is directly related to the message structure and the content of the message structure can be directly and uniquely determined through the version number, thereby achieving good application version control, and for different definitions in protocol contents, the assigned version numbers must be different.

S22: the server serializes a message to be transmitted, to obtain a corresponding byte stream.

After obtaining the target version number, the server serializes the message to be transmitted to obtain the corresponding byte stream, where the message to be transmitted carries the target version number, a structure of the status information can be acquired according to the target version number, and the serializing the information to be transmitted is a process of converting data of the status information to the corresponding byte stream.

S23: the server transmits the byte stream to the client.

S24: the client receives the byte stream transmitted by the server.

After serializing the information to be transmitted to obtain the byte stream, the server transmits the byte stream to the client, and the client receives the byte stream, thereby achieving the transmission of data from the server to the client.

S25: the client deserializes the byte stream according to the target version number, to obtain a corresponding message structure.

The deserialization refers to recovering the byte stream to the corresponding message structure. After serializing the data of the status information in the information to be transmitted to obtain the byte stream, the server transmits the byte stream to the client, and the client receives the byte stream. At the same time, since the information to be transmitted carries the target version number, the client can acquire the target version number, thereby ensuring the corresponding version protocol before the serialization and after the deserialization is the same. Then the client deserializes the byte stream according to the target version number, and the corresponding message structure can be obtained.

In the method for serialization and deserialization of a message structure according to the embodiment of the present disclosure, first the server acquires the message structure, and pre-processes the message structure to generate the corresponding target version number, and then the server serializes the information to be transmitted to obtain the corresponding byte stream, and transmits the byte stream to the client, where the information to be transmitted carries the target version number. After acquiring the byte stream, the client deserializes the byte stream according to the target version number to obtain the corresponding message structure. In this embodiment of the present disclosure, message structures with different contents correspond to different version numbers, that is, the target version number is directly related to and uniquely corresponding to the content of the message structure, therefore, the method according to the embodiment of the present disclosure has good version control, which avoids the problem that different object definitions may be assigned a same version number, ensuring that corresponding versions of protocol are the same during the serialization and deserialization, thereby avoiding the problem that the program runs incorrectly caused by inconsistency of the versions of the serialization and deserialization.

Figure 3:
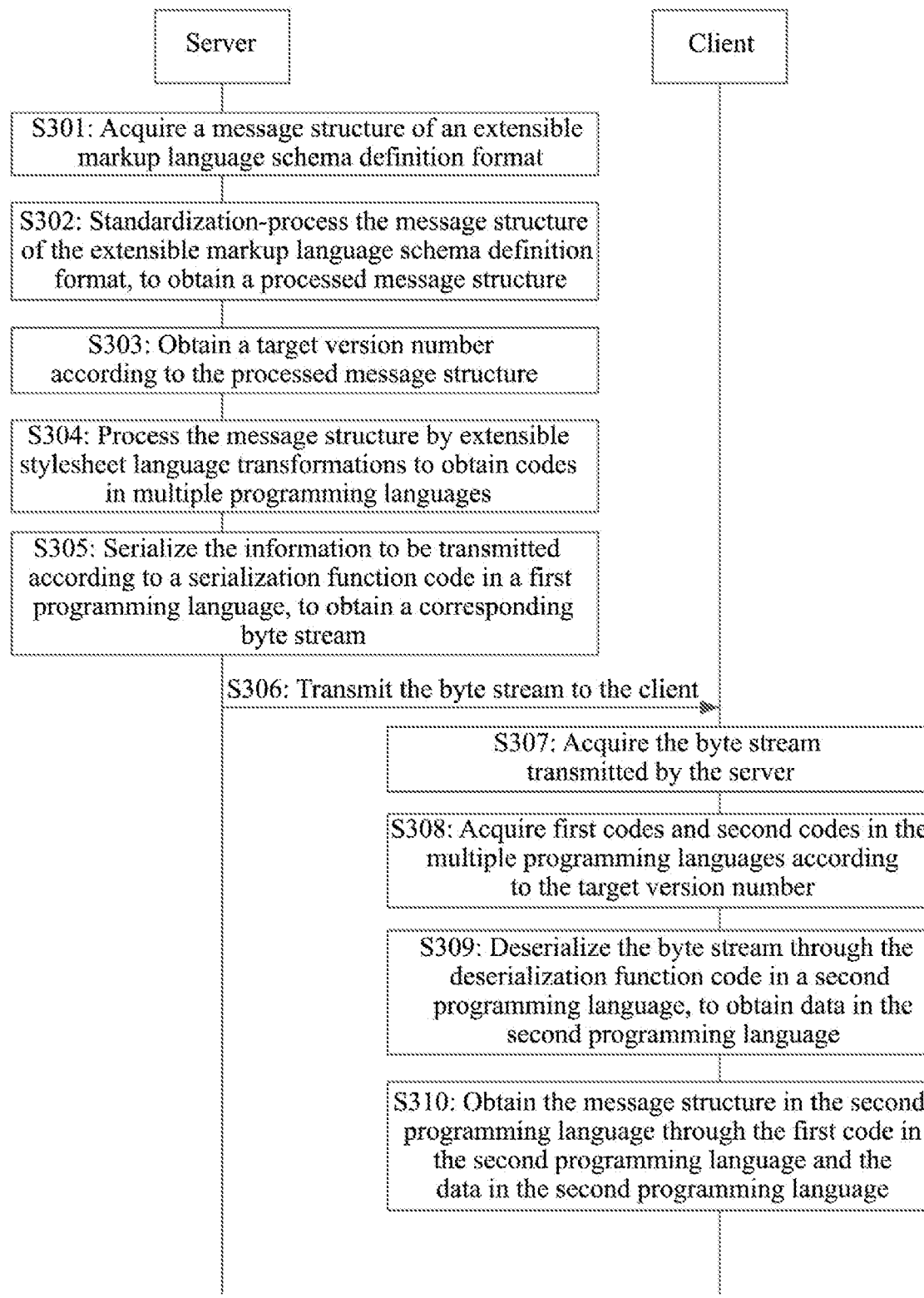
FIG. 3 is a schematic interaction diagram of an method for serialization and deserialization of a message structure according to another embodiment of the present disclosure.

The solutions of the present application will be described in detail below with reference to FIG. 3. FIG. 3 is a schematic interaction diagram of a method for serialization and deserialization of a message structure according to another embodiment of the present disclosure, as shown in FIG. 3, including:

S301: The server acquires a message structure of an extensible markup language schema definition format.

The extensible markup language (XML) is a subset of the standard universal markup language and is a markup language used to mark an electronic file to make it structural. In computers, a mark is an information symbol that a computer can understand. Various types of information can be processed between computers through the mark. The XML can be used to mark data and define a data type, and is a source language that allows a user to define his/her own markup language. The extensible markup language schema definition (XML Schema Definition, hereinafter referred to as XMD), the XML Schema language is the XSD. The XSD describes the structure of an XML document. An XSD may be specified to validate an XML document to check if the XML document meets its requirements. A document designer can specify a structure and content allowed by an XML document through the XSD, and can check whether an XML document is valid. An XSD may define: an element that appears in the document, an attribute that appears in the document, a sub-element, the number of the sub-elements, the order of the sub-elements, whether the element is empty, data type of the element and the attribute, default and fixed value of the element or the attribute. The XSD file has a suffix .xsd. This embodiment of the present disclosure defines a specific format of serialization through the XSD, and the advantages thereof are as follows:

1) Multiple platforms and frameworks have built-in support for the XSD;

2) XSD has a unified standardization process to ensure that one structure definition has a unique corresponding version number, and the corresponding version number is not affected when a defined layout format is changed.

The XSD file is used to describe the message structure, and a unique version number is obtained according to the content of the message structure, therefore, in the processes of serialization and deserialization, only the data of the status information needs to be transmitted, and the structure of the status information is not required to be transmitted. In the deserialization, the structure of the status information can be uniquely determined according to the target version number, and then the byte stream obtained by serialization is inversely converted, in combination with the structure of the status information, to the structured object in the memory.

In the following, the definition of the message structure of the XSD is illustrated by way of example, and the following code is an example of defining a serialization format using the XSD:

```
< xs: complesType name="GetUserData2Resp" >
< xs:sequence >
< xs:element name="name" type ="xs:string"/ >
< xs:element name="icon" type ="xs:string"/ >
< xs:element name="status" type ="varUnsignedShort"/ >
< xs:element name="ball_type" type ="varUnsignedShort"/ >
< xs:element name="diamond_reward_progress" type="varUnsignedInt"/ >
< xs:element name="sync_time" type ="varUnsignedLong"/ >
< xs:element name="remaining_ad_times" type ="varUnsignedShort"/ >
< xs:element name="bought_newcomer_package" type="varUnsignedShort"/ >
< xs:element name="signed_in_methods" type ="varUnsignedShort"/ >
< xs:element name="signed_in_days" type ="varUnsignedShort"/ >
< xs:element name="paid" type ="varUnsignedShort"/ >
< xs:element name="sub_free_trial" type ="varUnsignedShort"/ >
< xs:element name="received_sub_reward" type ="varUnsignedShort"/ >
< xs:element name="time_limited_props" type ="xs:string"/ >
< xs:element name="aircraft_id" type ="varInt"/ >
< xs:element name="aircrafts" type ="Aircraft" maxOccurs="unbounded"/ >
< xs:element name="received_skill_reward" type ="varShort"/ >
< xs:element name="received_examine_description_reward" type="varShort"/ >
< xs:element name="properties" type ="Property" maxOccurs="unbounded"/ >
< xs:element name="passed_levels" type ="PassedLevel"maxOccurs="unbounded"/
>
< /xs:sequence >
< /xs:complexType >
```

The xs:complexType is used to define the message structure, the xs:element is used to define a field name and a field type, and the maxOccurs is used to define an array type, where the type attribute with the var prefix is a custom variable length type, and the PassedLevel, Property, etc. are nested complexType.

S302: standardization-process the message structure of the extensible markup language schema definition format, to obtain a processed message structure.

The standardization-processing includes removing an annotation in the message structure of the extensible markup language schema definition format and ranking fields in the message structure of the extensible markup language schema definition format. Many parts of the XSD are order-independent. The elements and attributes of the order-independent parts of the XSD are ranked, all annotations and special marks are discarded. After the ranking, the format is sorted using the XML standardization manner of XSD, and the processed message structure can be obtained.

S303: obtain the target version number according to the processed message structure.

After the processed message structure is obtained, a fingerprint is calculated through an encryption algorithm to obtain the corresponding target version number, that is an interface version, for example, a message digest (hereinafter referred to as MD5) algorithm or a secure hash algorithm (hereinafter referred to as SHA1) algorithm may be used. The target version number obtain through this manner is directly related to and one-to-one corresponding to the content of the message structure.

S304: process the message structure by extensible stylesheet language transformations to obtain codes in multiple programming languages.

The extensible stylesheet language transformations (hereinafter referred to as XSLT) is a markup language for style transformation, which can transform an XML data file into another XML or other format, such a HTML page or a plain text.

In this embodiment of the present disclosure, the XSLT may be used as a compiler to compile interface definition files of multiple languages themselves. When the XSLT is used as the compiler for compiling, a developer needs to write a corresponding compiler for a target programming language, and write a serialization function code and a deserialization function code of a basic data type. For an integer, variable length compression encoding (in each byte, the lower 7 bits encode data, the highest bit is used as a flag bit indicating whether there is a subsequent byte, a negative number is encoded as its absolute value, a type in the memory corresponds to a 64-bit integer) is used; for a floating point number, fixed length encoding is used, which conforms to the IEEE standard; for a text string, an integer that is variable length encoded is used to identify a length, and the following is an actual text content.

Taking C++ as an example, for the case of producing a code for the C++ programming language, the result is two sets of class definition:

the first set is a template class, which actually describes a transmission format on the network;

the second set is a regular class, which actually describes a storage format in memory, which is also a data structure definition that the application code actually uses. In actual use, a regular class in a particular version together with a template class in another version forms a serialization/deserialization process. That is, the regular class is passed as the type argument of the template class to fulfill the pre-binding, because it will be compiled into machine instructions along with the C++ compiler.

For the client, the template class and the regular class are both a current version. For the server-side, the template class has multiple versions respectively corresponding to each client, and the memory class is generally the latest version, for logical use by the server.

For example, for the instance where the XSD is used to define the serialization format, a result of the regular class compiled using C++ is as following:

```
Struct GetUserData2Resp{
    char *name;
    char *icon;
    uint16_t status;
    uint16_t ball_type;
    uint32_t diamond_reword_progress;
    uint 64_t sync_time;
    uint16_t remaining_ad_times;
    uint16_t bought_newcomer_package;
    uint16_t signed_in_methods;
    uint16_t signed_in_days;
    uint16_t paid;
    uint16_t sub_free_trial;
    uint16_t received_sub_reward;
    char *time_limited_props;
    int32_t aircraft_id;
    size_t aircraftsSize;
    Aircraft *aircrafts;
    int16_t received_skill_reward;
    int16_t received_examine_description_reward;
    size_t propertiesSize;
    Property *properties;
    size_t passed_lecelsSize;
    passedLevel *passed_levels;
};
``` for the instance where the XSD is used to define the serialization format, a result of the template class compiled using C++ is as following:

```
Struct CGetUserData2RespSerislizer{
    static bool Serialize(W *pWriter,void const *pObj) {
        T const *pTypeObj-static_cast< T* > (pObj);
        return Serialize(pWriter, *pTyoeObj);
    }
    static bool Serialize(W *pWriter,T const&refObj) {
        if(!OptSerializename < T > (pWriter,refObj)){
            return false;
        }
        if(!OptSerializeicon < T > (pWriter,refObj)){
            return false;
        }
        if(!OptSerializestatus < T > (pWriter,refObj)){
            return false;
        }
        if(!OptSerializeball_type < T > (pWriter,refObj)){
            return false;
        }
        if(!OptSerializediamond_reward_progress < T > (pWriter.refObj)){
            return false;
        }
        if(!OptSerializesync_time < T > (pWriter,refObj)){
            return false;
        }
        if(!OptSerializeremaining_ad_times < T > (pWriter,refObj)){
            return false;
        }
        if(!OptSerializebought_newcomer_package < T > (pWriter,refObj)){
            return false;
        }
        if(!OptSerializesigned_in_methods < T > (pWriter,refObj)){
            return false;
        }
```

S305: the server serializes the information to be transmitted according to a serialization function code in a first programming language, to obtain a corresponding byte stream.

Codes in multiple programming languages, such as a C language code, a C++ code and a Java code, can be obtained by processing the message structure through the XSLT. The code in each programming language generated after the processing the message structure through the XSLT includes two parts, where a first part is a data structure code corresponding to the message structure, which is used for describing the structure of the status information, and a second part is a serialization function code and a deserialization function code in the corresponding programming language, which is used for serialization and deserialization processing of the message structure.

For a first programming language currently used by the server, the information to be transmitted can be serialized according to the serialization function code in the first programming language, to obtain the corresponding byte stream.

S306: the server transmits the byte stream to the client.

S307: the client acquires the byte stream transmitted by the server.

After serializing the data of the status information in the information to be transmitted to obtain the byte stream, the server transmits the byte stream to the client, and the client receives the byte stream. At the same time, since the information to be transmitted carries the target version number, the client can acquire the target version number, thereby ensuring the corresponding XSD file before the serialization and after the deserialization is the same.

S308: the client acquires first codes and second codes in the multiple programming languages according to the target version number.

The first codes and the second codes in the multiple programming languages are obtained through the target version number carried in the information to be transmitted. The multiple programming language may include C, C++ and Java and the like. The first code refers to a data structure code corresponding to the message structure in a certain programming language, and the second code refers to the serialization function code and the deserialization function code in a certain programming language.

S309: The client deserializes the byte stream through the deserialization function code in a second programming language, to obtain data in the second programming language.

There is a programming language corresponding to the client, that is the second programming language. After obtaining the codes in the programming languages, the client acquires the deserialization function code in the second programming language according to the second programming language used by itself, and deserializes the byte stream through the deserialization function code in the second programming language to obtain the data in the second programming language.

S310: the client obtains the message structure in the second programming language through the first code in the second programming language and the data in the second programming language.

After obtaining the data in the second programming language, the client obtains the message structure in the second programming language by processing the data in the second programming language through running the first code in the second programming language. For example, a structure in C++ is a struct, and the struct includes two elements which respectively are int a and char b. The struct is serialized and deserialized to obtain the corresponding message structure in Java as a class including two elements which respectively are int a and char b.

In the method for serialization and deserialization of a message structure according to the embodiment of the present disclosure, first the server acquires the message structure of the extensible markup language schema definition format, standardization-processes the message structure, generates the corresponding target version number according to the processed message structure, then serializes the information to be transmitted through the extensible stylesheet language transformations to obtain the corresponding byte stream, and transmits the corresponding byte stream to the client, where the information to be transmitted carries the target version number. After acquiring the byte stream, the client deserializes the byte stream according to the target version number to obtain the corresponding message structure. In this embodiment, message structures with different contents correspond to different version numbers, that is, the target version number is directly related to and uniquely corresponding to the content of the message structure, and therefore, the method according to this embodiment of the present disclosure has good version control, which avoids the problem that different object definitions may be assigned a same version number, ensuring that the serialization and deserialization correspond to the protocol of the same version number, thereby avoiding the problem that the program runs incorrectly caused by inconsistency of the versions of the serialization and deserialization. At the same time, in this embodiment of the present disclosure, the field name and the field type information are not required to transmit, which reduces the volume of the serialization structure and the network traffic consumed by the network transmission, and information processing such as determining the field type is not required at the runtime, which improves the running speed.

Figure 4:
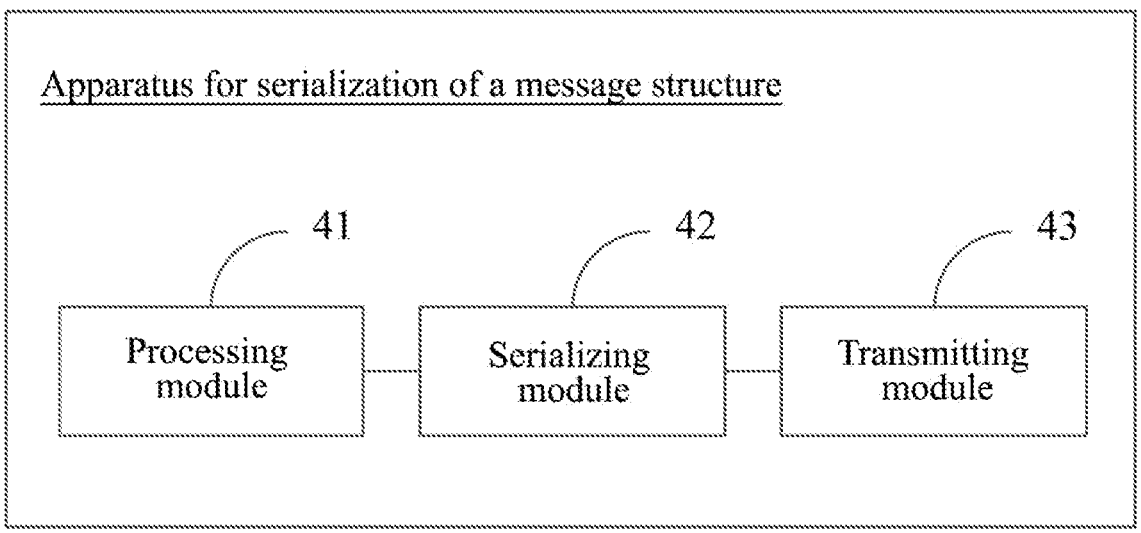
FIG. 4 is a schematic structural diagram of an apparatus for serialization of a message structure according to an embodiment of the present disclosure.

FIG. 4 is a schematic structural diagram of an apparatus for serialization of a message structure according to an embodiment of the present disclosure, as shown in FIG. 4, including: a processing module 41, a serializing module 42 and a transmitting module 43, where:

the processing module 41 is configured to acquire a message structure, and pre-process the message structure to generate a corresponding target version number, where message structures with different contents correspond to different version numbers, and the message structure is a structure of status information transmitted by a server to a client;

the serializing module 42 is configured to serialize information to be transmitted to obtain a corresponding byte stream, where the information to be transmitted carries data of the status information and the target version number; and the transmitting module 43 is configured to transmit the byte stream to the client.

In a possible implementation, a format of the message structure is an extensible markup language schema definition format, and the serializing module 42 is specifically configured to:

process the message structure through extensible stylesheet language transformations to obtain codes in multiple programming languages, where a code in each of the programming languages includes a first code and a second code, where the first code is a data structure code corresponding to the message structure, and the second code is a serialization function code and a deserialization function code;

serialize the information to be transmitted according to a serialization function code in a first programming language to obtain a corresponding byte stream, where the first programming language is one of the multiple programming languages.

In a possible implementation, the processing module 41 is specifically configured to:

acquire a message structure of an extensible markup language schema definition format;

standardization-process the message structure of the extensible markup language schema definition format to obtain a processed message structure, where the standardization-processing includes removing an annotation in the message structure of the extensible markup language schema definition format and ranking fields in the message structure of the extensible markup language schema definition format;

obtain the target version number, according to the processed message structure.

Figure 5:
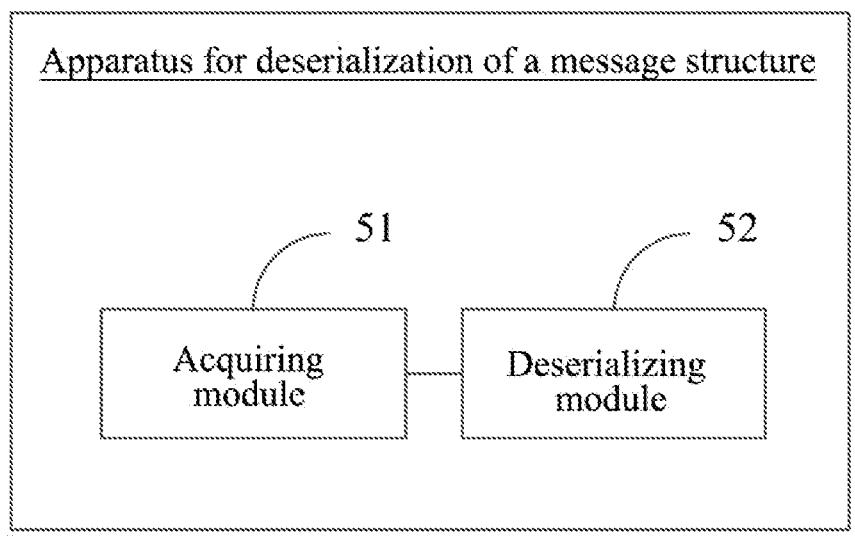
FIG. 5 is a schematic structural diagram of an apparatus for deserialization of a message structure according to an embodiment of the present disclosure.

FIG. 5 is a schematic structural diagram of an apparatus for deserialization of a message structure according to an embodiment of the present disclosure, as shown in FIG. 5, including an acquiring module 51 and a deserializing module 52, where:

the acquiring module 51 is configured to acquire a byte stream transmitted by the server, where the byte stream includes data of status information and a target version number, and the byte stream is obtained by serializing the data of the status information and the target version number by the server; and The deserializing module 52 is configured to deserialize the byte stream according to the target version number, to obtain a corresponding message structure.

In a possible implementation, the deserializing module 52 is specifically configured to:

acquire codes in multiple programming languages according to the target version number, where a code in each of the programming languages includes a first code and a second code, where the first code is a data structure code corresponding to the message structure, and the second code is a serialization function code and a deserialization function code, the byte stream is obtained by serializing data of the message structure according to the serialization function code in a first programming language, where the first programming language is one of the multiple programming languages;

deserialize the byte stream through a deserialization function code in a second programming language to obtain data in the second programming language, where the second programming language is one of the multiple programming languages;

obtain a message structure in the second programming language through the first code in the second programming language and the data in the second programming language.

In a possible implementation, the deserializing module 52 is specifically configured to:

acquire a message structure of a corresponding extensible markup language schema definition format, according to the target version number;

acquire the first code and the second code in the multiple programming languages, according to the message structure of the extensible markup language schema definition format.

The apparatuses according to this embodiment of the present disclosure can be used to perform the technical solutions in the above method embodiments, the implementation principles and the technical effects are similar, and details are not described herein again.

Figure 6:
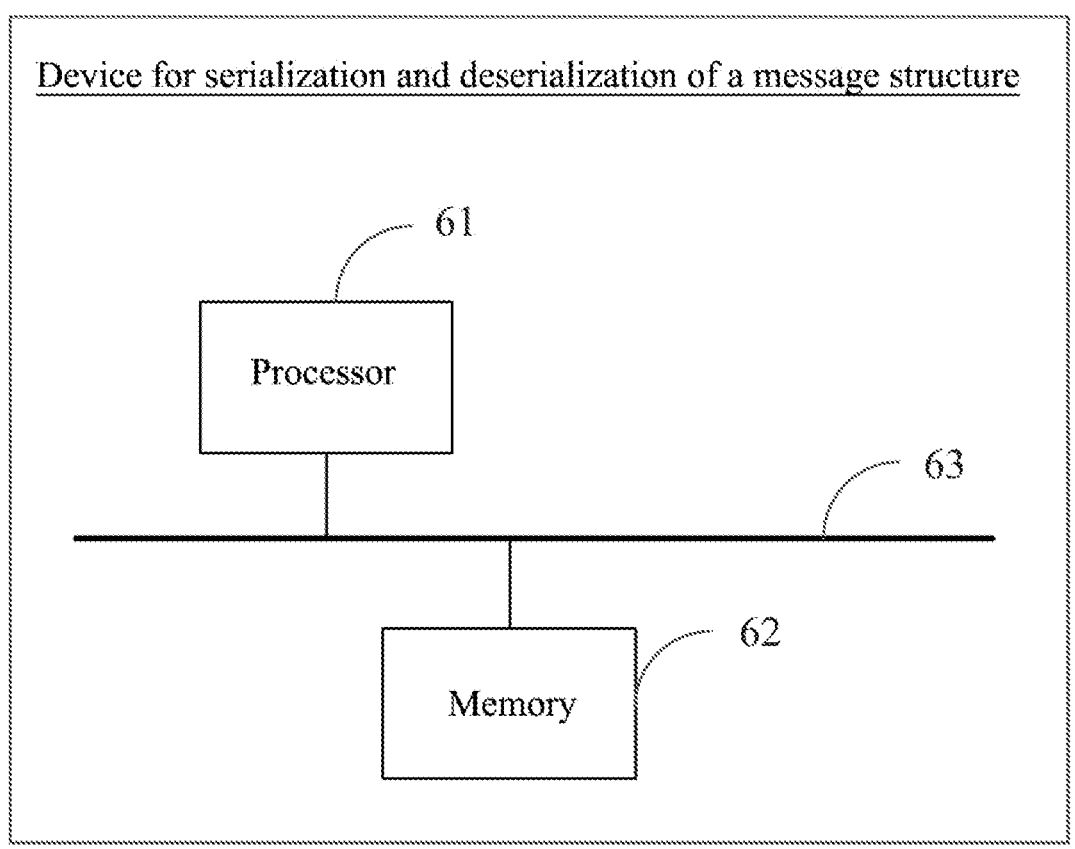
FIG. 6 is a schematic hardware structural diagram of a device for serialization and deserialization of a message structure according to an embodiment of the present disclosure.

FIG. 6 is a schematic hardware structural diagram of a device for serialization and deserialization of a message structure according to an embodiment of the present disclosure, as shown in FIG. 6, the device for serialization and deserialization of a message structure includes: at least one processor 61 and a memory 62. The processor 61 and the memory 62 are connected via a bus 63.

Optionally, the device further includes a communication component. For example, the communication component may include a receiver and/or a transmitter.

In a specific implementation process, at least one processor 61 executes a computer execution instruction stored in the memory 62, causing the at least one processor 61 to perform the method for serialization and deserialization of a message structure as described above.

For a specific implementation process of the processor 61, reference may be made to the foregoing method embodiments, and the implementation principles and technical effects are similar, of which the details are not described herein again.

In the embodiment as shown in FIG. 6, it should be understood that the above processor may be a central processing unit (CPU), or may be other general processor, a digital signal processor (DSP), an application specific integrated circuit (ASIC), etc. The general processor may be a microprocessor, or the processor may be any conventional processor or the like. Steps of the method disclosed in the present disclosure may be directly implemented as a hardware processor, or may be performed by a combination of hardware and software modules in the processor.

The memory may include a high-speed RAM memory, and may also include a non-volatile memory NVM, such as at least one disk memory.

The bus may be an industry standard architecture (ISA) bus, a peripheral component (PCI) bus, an extended industry standard architecture (EISA) bus or the like. The bus can be divided into an address bus, a data bus, a control bus, and the like. For ease of illustration, the bus in the drawings of the present application is not limited to only one bus or one type of bus.

The present application further provides a computer readable storage medium having a computer execution instruction stored thereon, and a processor, when executing the computer execution instruction, implements the method for serialization and deserialization of a message structure as described above.

The above computer readable storage medium may be implemented by any type of volatile or non-volatile storage device or by a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk. The readable storage medium may be any available media that can be accessed by a general purpose or special purpose computer.

An exemplary storage medium is coupled to the processor to enable the processor to read information from, and write information to, the readable storage medium. Of course, the readable storage medium may also be an integral part of the processor. The processor and the storage medium may be located in application specific integrated circuits (ASIC). Of course, the processor and the readable storage medium may also exist as discrete components in an electronic device.

The division of the unit is only a division of logical functions. In actual implementations, there may be another division manner, for example, multiple units or components may be combined or integrated into another system, or some features can be omitted or not executed. In addition, the mutual coupling or direct coupling or communication connection shown or discussed may be an indirect coupling or communication connection through some interfaces, devices or units, and may be in an electrical, a mechanical or other form.

The units described as separate components may or may not be physically separated, and the components illustrated as units may or may not be physical units, that is, may be located in one place, or may be distributed to multiple network units. Some or all of the units may be selected according to actual needs to achieve the purpose of the solutions of the embodiment.

In addition, various functional units in various embodiments of the present application may be integrated into one processing unit, or various units may exist physically separately, or two or more units may be integrated into one unit.

If implemented in a form of a software functional unit and sold or used as an independent product, the functions may be stored in a computer readable storage medium. Based on such understanding, the technical solutions of the present disclosure in essence, or the part contributing to the prior art, or a part of the technical solutions may be implemented in a form of a software product. The computer software product is stored in a storage medium, and includes several instructions for enabling a computer device (which may be a personal computer, a server, or a network device, etc.) to perform all or a part of the steps of the methods described in the embodiments of the present disclosure. The foregoing storage medium includes: any medium that can store program codes, such as a USB flash disk, a mobile hard disk, a read-only memory (ROM), a random access memory (RAM), a magnetic disk, or an optical disc, etc.

One of ordinary skill in the art will appreciate that all or some of the steps of the various method embodiments described above may be realized by a program instructing relevant hardware. The above-mentioned program can be stored in a computer readable storage medium. The program, when executed, performs the steps including the above method embodiments, and the above storage medium includes various media that can store program codes, such as a ROM, a RAM, a magnetic disk, or an optical disk.

Finally, it should be noted that the above embodiments are only used to illustrate the technical solutions of the present disclosure, and the technical solutions of the present disclosure are not limited thereto. Although the present disclosure has been described in detail with reference to the foregoing embodiments, those skilled in the art should understand that the technical solutions described in the above embodiments may be modified, or some of the technical features may be equivalently substituted, and those modifications or substitutions do not deviate the nature of the corresponding technical solutions from the scope of the technical solutions of respective embodiments of the present disclosure.

What is claimed is:

1. A method for serialization of a message structure, comprising:
   acquiring a message structure, and pre-processing the message structure to generate a corresponding target version number, wherein message structures with different contents correspond to different version numbers, and the message structure is a structure of status information transmitted by a server to a client;
   serializing information to be transmitted to obtain a corresponding byte stream, wherein the information to be transmitted carries data of the status information and the target version number; and
   transmitting the byte stream to the client;
   wherein a format of the message structure is an extensible markup language schema definition format, and the serializing information to be transmitted to obtain a corresponding byte stream comprises:
   processing the message structure through extensible stylesheet language transformations to obtain codes in multiple programming languages, wherein a code in each of the programming languages comprises a first code and a second code, wherein the first code is a data structure code corresponding to the message structure, and the second code is a serialization function code and a deserialization function code; and
   serializing the information to be transmitted according to a serialization function code in a first programming language to obtain a corresponding byte stream, wherein the first programming language is one of the multiple programming languages.

2. The method according to claim 1, wherein the acquiring a message structure, and pre-processing the message structure to generate a corresponding target version number comprises:
   acquiring a message structure of an extensible markup language schema definition format;
   standardization-processing the message structure of the extensible markup language schema definition format to obtain a processed message structure, wherein the standardization-processing comprises removing an annotation in the message structure of the extensible markup language schema definition format and ranking fields in the message structure of the extensible markup language schema definition format; and
   obtain the target version number, according to the processed message structure.

3. A method for deserialization of a message structure, comprising:
   acquiring a byte stream transmitted by a server, wherein the byte stream comprises data of status information and a target version number, and the byte stream is obtained by serializing the data of the status information and the target version number by the server; and
   deserializing the byte stream according to the target version number, to obtain a corresponding message structure;
   wherein the deserializing the byte stream according to the target version number, to obtain a corresponding message structure comprises:
   acquiring codes in multiple programming languages according to the target version number, wherein a code in each of the programming languages comprises a first code and a second code, wherein the first code is a data structure code corresponding to the message structure, and the second code is a serialization function code and a deserialization function code, the byte stream is obtained by serializing data of the message structure according to the serialization function code in a first programming language, wherein the first programming language is one of the multiple programming languages;
   deserializing the byte stream through a deserialization function code in a second programming language to obtain data in the second programming language, wherein the second programming language is one of the multiple programming languages; and obtaining a message structure in the second programming language through a first code in the second programming language and the data in the second programming language.

4. The method according to claim 3, wherein the acquiring codes in multiple programming languages according to the target version number comprises:
acquiring a message structure of a corresponding extensible markup language schema definition format, according to the target version number; and
acquiring the first code and the second code in the multiple programming languages, according to the message structure of the extensible markup language schema definition format.

5. A device for serialization of a message structure, comprising: at least one processor and a memory, wherein,
the memory stores a computer execution instruction;
the at least one processor executes the computer execution instruction, causing the at least one processor to
acquire a message structure, and pre-process the message structure to generate a corresponding target version number, wherein message structures with different contents correspond to different version numbers, and the message structure is a structure of status information transmitted by a server to a client;
serialize information to be transmitted to obtain a corresponding byte stream, wherein the information to be transmitted carries data of the status information and the target version number; and
transmit the byte stream to the client;
wherein the at least one processor executes the computer execution instruction, further causing the at least one processor to:
process the message structure through extensible stylesheet language transformations to obtain codes in multiple programming languages, wherein a code in each of the programming languages comprises a first code and a second code, wherein the first code is a data structure code corresponding to the message structure, and the second code is a serialization function code and a deserialization function code; and
serialize the information to be transmitted according to a serialization function code in a first programming language to obtain a corresponding byte stream, wherein the first programming language is one of the multiple programming languages.

6. The device according to claim 5, wherein the at least one processor executes the computer execution instruction, further causing the at least one processor to:
acquire a message structure of an extensible markup language schema definition format;
standardization-process the message structure of the extensible markup language schema definition format to obtain a processed message structure, wherein the at least one processor executes the computer execution instruction, further causing the at least one processor to: remove an annotation in the message structure of the extensible markup language schema definition format and ranking fields in the message structure of the extensible markup language schema definition format; and
obtain the target version number, according to the processed message structure.

7. A device for deserialization of a message structure, comprising:
at least one processor and a memory, wherein,
the memory stores a computer execution instruction;
the at least one processor executes the computer execution instruction, so that the at least one processor performs the method for deserialization of a message structure according to claim 3.

8. A computer readable storage medium having a computer execution instruction stored thereon, and when the computer execution instruction is executed by a processor, the method for serialization of a message structure according to claim 1 is implemented.

9. A computer readable storage medium having a computer execution instruction stored thereon, and when the computer execution instruction is executed by a processor, the method for deserialization of a message structure according to claim 3 is implemented.

* * * * *